United States Patent [19]

Reed

[11] Patent Number: 5,170,361
[45] Date of Patent: Dec. 8, 1992

[54] FLUID TEMPERATURE, FLOW RATE, AND VOLUME CONTROL SYSTEM

[76] Inventor: Mark Reed, 509 - 825 Granville St., Vancouver, B.C., V6Z 1K9, Canada

[21] Appl. No.: 465,369

[22] Filed: Jan. 16, 1990

[51] Int. Cl.⁵ ............................................. G05D 23/13
[52] U.S. Cl. .................................. 364/510; 236/12.12
[58] Field of Search ....................... 364/510; 236/12.12

[56] References Cited

U.S. PATENT DOCUMENTS

| | | | |
|---|---|---|---|
| 3,474,438 | 10/1969 | Lauher | 340/722 X |
| 4,204,204 | 5/1980 | Pitstick | 340/712 |
| 4,413,314 | 11/1983 | Slater et al. | 364/188 |
| 4,420,811 | 12/1983 | Tarnay et al. | 364/510 |
| 4,563,780 | 1/1986 | Pollack | 4/192 |
| 4,682,728 | 7/1987 | Oudenhoven | 236/12.12 |
| 4,693,415 | 9/1987 | Shakalis | 236/12.12 |
| 4,700,884 | 10/1987 | Barrett et al. | 236/12.12 |
| 4,711,392 | 12/1987 | Kidouchi et al. | 236/12.12 |
| 4,945,943 | 8/1990 | Cogger | 236/12.12 X |

FOREIGN PATENT DOCUMENTS

| | | |
|---|---|---|
| 0299696 | 1/1989 | European Pat. Off. |
| 0014677 | 1/1985 | Japan |

Primary Examiner—Dale M. Shaw
Assistant Examiner—S. A. Melnick

[57] ABSTRACT

A system is disclosed for independently attaining, monitoring, and dispensing a fluid mix or a plurality of fluid mixes of a desired temperature, flow rate, and volume, the fluid mixes each comprising two separate mixable fluids usually at different temperatures as they enter the system. The system comprises one microprocessor configuration connected with any number of fluid mixing apparatuses including their drive means, sensors, and an appropriate number of user command and system status feedback means. In one embodiment, as disclosed herein, a plurality of system users can independently and even simultaneously instruct, using a variety of means, a single microprocessor configuration to provide their desired fluid mixes. The microprocessor configuration compares the instructions with the system status data provided by the sensors and its own calculations. Whenever the data differs from the instructions, it causes the fluid mixing apparatuses' drive means to operate in such a way as to provide mixes which match the users' commands. Users are provided with system status information all the while.

2 Claims, 8 Drawing Sheets

FLUID TEMPERATURE, FLOW RATE, AND VOLUME CONTROL SYSTEM

FIELD OF THE INVENTION

This invention relates to a system for delivering a fluid at user-defined temperatures, flow rates, and volumes, by mixing at least two source fluids that have different temperatures and variable flow rates. Such a system addresses itself to plumbing systems within buildings which require one or a plurality of faucets to deliver water at different temperatures, flow rates, and volumes. In such an application, once delivery has begun, the mix is preferred not to deviate from its original setting. This invention relates to a system which will ensure that the settings will not deviate, except as required, regardless of how many fluid outlets are on the system, regardless of how they are individually used, regardless of whether or not each fluid is on an otherwise independent fluid plumbing system, and regardless of whether each fluid is chemically different from others in the control system. The system herein described also addresses any other fluid mix delivery system requiring control of the mix temperature, flow rate, and volume. Some specific systems are in pulp processing mills, food and beverage processing plants, and life systems research facilities. Users can enter commands in the system using a variety of means including touching a control panel adjacent to the fluid dispenser, touching a remote control panel, voice actuation, and pre-programming.

DESCRIPTION OF THE PRIOR ART

Manually controlled fluid mix means, such as hand-operated valves at a kitchen sink faucet, have been in wide use for decades. In their most advanced form, without resorting to electronics, attainment of fluid mix of a specific temperature and flow rate combination is a time consuming, wet, and a trial-and-error process. While some systems allow for precise temperature selection, the flow rate is not usually so tended. In some applications, especially in industry, where both aspects of the mix are relatively accurately controlled, a first mechanism is adjusted and then another. In a fluid supply system having more than one outlet, such as in nearly every residential building, the non-electronic systems just described are unable to maintain, without fluctuations, a precise and deviation-free fluid flow. Electronic-assist systems greatly improve this last situation but, except for a few very expensive and elaborate systems, are incapable of generating a wholly new fluid mix setting without mechanical user-input and, still, the temperature and flow rate control mechanisms are linear. Also, except for a very few high-end electronic systems, none of these methods address total volume control; the user must manually terminate the flow. Even the most sophisticated systems offer only rudimentary volume control. With respect to plumbing systems in buildings, all of these problems are effectively eliminated with the recent introduction of all electronic control systems. The desired water mix temperature and flow rate is achieved with one mechanism comprising of two motor-driven valves, one each for the two different temperature water sources. Other components in the system are a microprocessor, sensors, and a control panel. Such a control system is disclosed in U.S. Pat. No. 4,420,811 which issued to Tarnay et al. Some of the limitations of this system are that it is specifically directed toward the mix of water in a domestic situation, it addresses only one faucet per system, uses motors as the only valve drive means, and employs sophisticated algorithms for the microprocessor to work with. For example, the system generates a control signal based on the magnitude of the error signal, the rate of changes in that signal, and the length of time the error has existed. All of this results in a somewhat limited and pricey system. And still, control of the total amount delivered, i.e. volume, is not addressed and the user must be on hand to instruct the system to terminate the flow. In addition, the water temperature at the faucet does not always give an accurate indication of the water temperature in the tub. Very often, the tub may be at a much lower temperature than the water. Heat is then lost until the temperature of the water and tub have reached equilibrium. It is useful to at least monitor if not control this discrepancy. This may be of considerable importance in some applications such as in hospitals for the treatment of burned victims, in processing plants for production of food, medicine or chemicals, etc.

A system that addresses most of the considerations noted above is disclosed in U.S. Pat. No. 4,700,884, issued to Barrett. It controls the temperature, flow rate, and, on a basic level, the volume of a liquid in a plumbing system. It also incorporates a means to withhold delivery of the liquid until the specified temperature is achieved. This is accomplished with a cost in time as the liquid is recirculated within its plumbing system until it is heated to the correct temperature. This requires that, in addition to the usual hot water tank, a second holding tank and associated plumbing be employed. The system also requires that all of the plumbing utilities that are to be electronically controlled must be interconnected and be of on single plumbing network. It precludes the possibility of controlling other types of the liquids or fluids. It makes changes to the plumbing, such as adding a bathroom, difficult and costly. It requires new types of bathtubs and toilets. Such a system is clearly not intended for easy add-in applications but rather only for elaborate new construction and extensive plumbing renovations.

SUMMARY OF THE INVENTION

The present invention provides the means to overcome the difficulties just described. Additionally, it provides the means to allow continued upgrading and expansion of the system as well as the ability for the system to be incorporated into other electronic control systems. The present invention provides the means to control the temperature, flow rate, and volume of a mix of any two mixable fluids in a piping system comprising:

a) a first valve for regulating a first flow of fluid from a first fluid supply means in the piping system;

b) a second valve for regulating a second flow of fluid, having a different temperature from the first flow of liquid, from a second fluid supply means in the piping system;

c) drive means for activating each of the first and second valves;

d) valve open or closed sensing means for each of the first and second valves;

e) a dispensing pipe for carrying mixed liquid from the first and second fluid supply means;

f) mixed fluid temperature sensing means;

g) mixed fluid flow rate sensing means;

h) user interface means comprising a fluid flow rate selecting means and a fluid temperature selecting means, adapted to allow the user to select a flow rate from a range of available flow rates and a temperature from a range of available temperatures;

i) processor means that receives data from the valve open or closed sensing means, the mixed fluid temperature sensing means, the mixed fluid flow rate sensing means, and the user interface means compares user selected data with sensing means data, and sends signals to control the drive means in order to obtain the selected fluid flow rate and temperature of the dispensed fluid.

The control system provides the means to allow for any type of drive means to drive the fluid mixing apparatus(es). It also provides the means to allow a variety of simple instruction input means to input instructions to the system's microprocessor and likewise allow a variety of means to provide the user with system status information. As a safety feature, the invention provides two separate and independent means, outside its normal operation systems, to stop the fluid flow. One means automatically closes all appropriate valves when the system's normal drive means fails. The other is a manually operated valve or valves located appropriately within the system. In addition, means is provided to monitor temperature of the fluid in the container system receiving the fluid.

A significant aspect of the system is its ability to independently and simultaneously control a plurality of sets of drive means without any two sets being linked via a piping system. The system's single microprocessor can control the mixture of entirely different types of fluids in independent and unrelated piping systems. This allows for the easy modification, addition, and/or deletion of drive means and utilities on any and all of the piping systems to be controlled. It allows for the addition or deletion of whole piping systems to or from the control system of the within invention.

DESCRIPTION OF THE PREFERRED EMBODIMENTS

The following discloses how the present invention delivers fluid mixes wherever control of fluid temperature, flow rate, and volume is desired. This disclosure specifically addresses an application requiring mixes of hot and cold water to be dispensed from a plurality of faucets in a building such as a home or hotel, in which the processor means receives data from multiple sets of:

a) the valve open or closed sensing means for each of the first and second valves;
b) the dispensing pipe;
c) the mixed fluid temperature sensing means;
d) the mixed fluid flow rate sensing means;
e) the user interface means;

and sends signals to control multiple sets of the drive means for each of the first and second valves in order to obtain multiple selected fluid flow rates and temperatures at a multiplicity of locations throughout the piping system.

Alternate means for performing specific functions of the system will be described accordingly, particularly when referring to the system's application outside the realm of the normal home or hotel.

Figure 1:
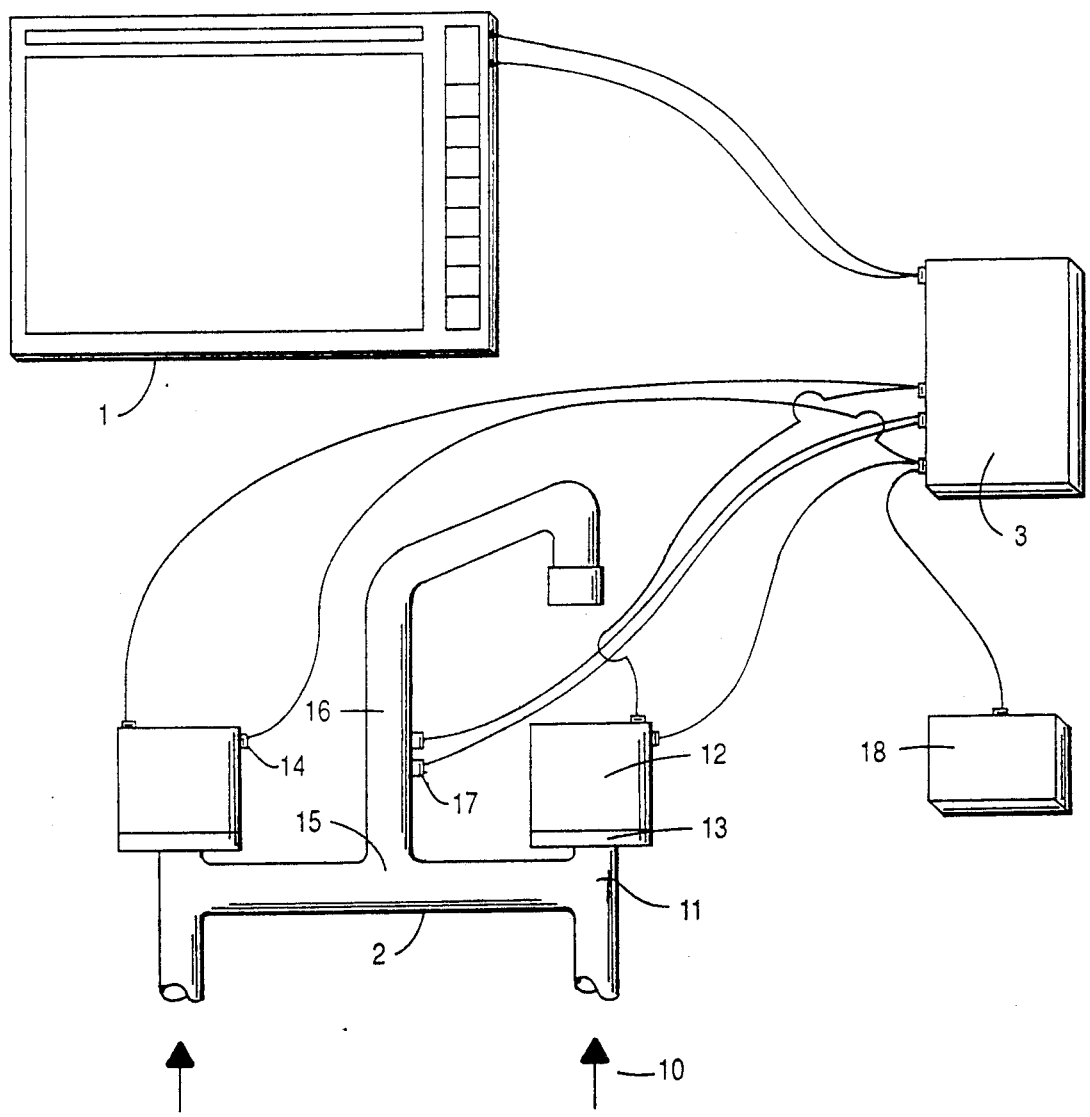
FIG. 1 is a schematic of the relationship to each other of the three main invention system components as they would appear in a typical domestic application.

Referring to FIG. 1, three separate components, when linked, comprise the invention. They are the control panel 1, the valve drive/fluid mix apparatus 2, and the microprocessor 3. The user, via the control panel, instructs the microprocessor to operate the valve drive/fluid mix apparatus to deliver the user's desired fluid mix. Details of each of the three components may change depending on the user's nature and requirements, the fluid type, and the valve drive means.

The valve drive/fluid mix apparatus 2 can be of various designs. It will suit the purposes of the invention as long as it can independently and simultaneously regulate the flow of two fluid streams, combine the two streams into one, and measure the temperature and flow rate of the resultant fluid stream. It must be able to accept and follow instructions from the microprocessor as to the regulation of fluid flow through two valves and it must be able to advise the microprocessor of the temperature and flow rate values. It must also be able to advise the microprocessor as to when and whether a valve, and which one, is fully open or closed.

The valve drive means can be of any type including pneumatic, hydraulic, magnetic, or electric. Likely, the pneumatic and hydraulic drive means will be used only in situations where the valves they drive are large in size relative to those used in the average domestic application, or where electric motors are preferred not to be used for whatever reason.

The preferred embodiment of the valve drive/fluid mix apparatus for use in a domestic application is described here.

Each of the two incoming water streams 10, one hot, and the other cold, upon entering the invention, pass through valves 11. Each valve is driven by an electric motor 12 with an appropriate gear mechanism 13 together capable of opening and closing the valve smoothly, quickly, and with precision. That is, the valve must stop or start movement precisely when the microprocessor instructs it to. The valve must be capable of being adjusted by very small increments. The more precise the valve movement, the greater degree of precision the user has in selecting water temperature and flow rate. Additionally, the valves must be driven quickly but also just short of such a speed that would have the valves overshoot their optimum positions before the microprocessor can determine that these positions have been obtained. Also, sensors 14 must be incorporated to advise the microprocessor when and whether a valve, and which one, is fully open or closed.

An optional set-up would be to have a third valve in communication with the control circuit to control the flow rate after the fluid mix is adjusted to the correct temperature by the first two valves.

Upon exiting the two valves, the regulated, but still separate, streams of water enter a piping configuration 15 designed to unite the streams into one. This can be a simple 'T' or 'Y' shaped pipe. The mixed flow is now carried via a single pipe 16.

Along the pipe, near the point of delivery to the user, are two sensors 17. One senses the water temperature, and the other the flow rate. In the domestic situation, these sensors will likely be placed out of sight but near enough to the faucet that temperature changes between the sensors and the faucet will be inconsequential. An external sensor 18 can be used in situations where water is discharged in a bath tub. The temperature of the tub itself will often be substantially below that of the discharged water. Therefore, a certain amount of heat loss will arise until a temperature equilibrium exists between the water and the tub. Sensor 18 could be placed at a predetermined location on the tub to monitor temperature change and allow for adjustments in water temperature to be made. In addition, sensor 18 could also be comprised of a water level sensor or conductivity probe able to monitor the level of water in the tub. Alternatively the sensor 18 could comprise two parts, located on hot and cold intakes respectively prior to the mix, which would measure the temperature and flow rate of fluid in each and enable a processor to calculate the temperature and flow rate of the resulting mix. This alterative, while more complex, would meet the need to fit the invention in plumbing systems where it would be physically inconvenient or impossible, due to space or accessibility restrictions, to place the sensor into the system at a point past the area of the mixing.

The data all the sensors provide is used by the microprocessor so that it can correctly instruct the valve drive apparatuses as to which way to adjust the valves, if at all, at any given time.

Figure 2:
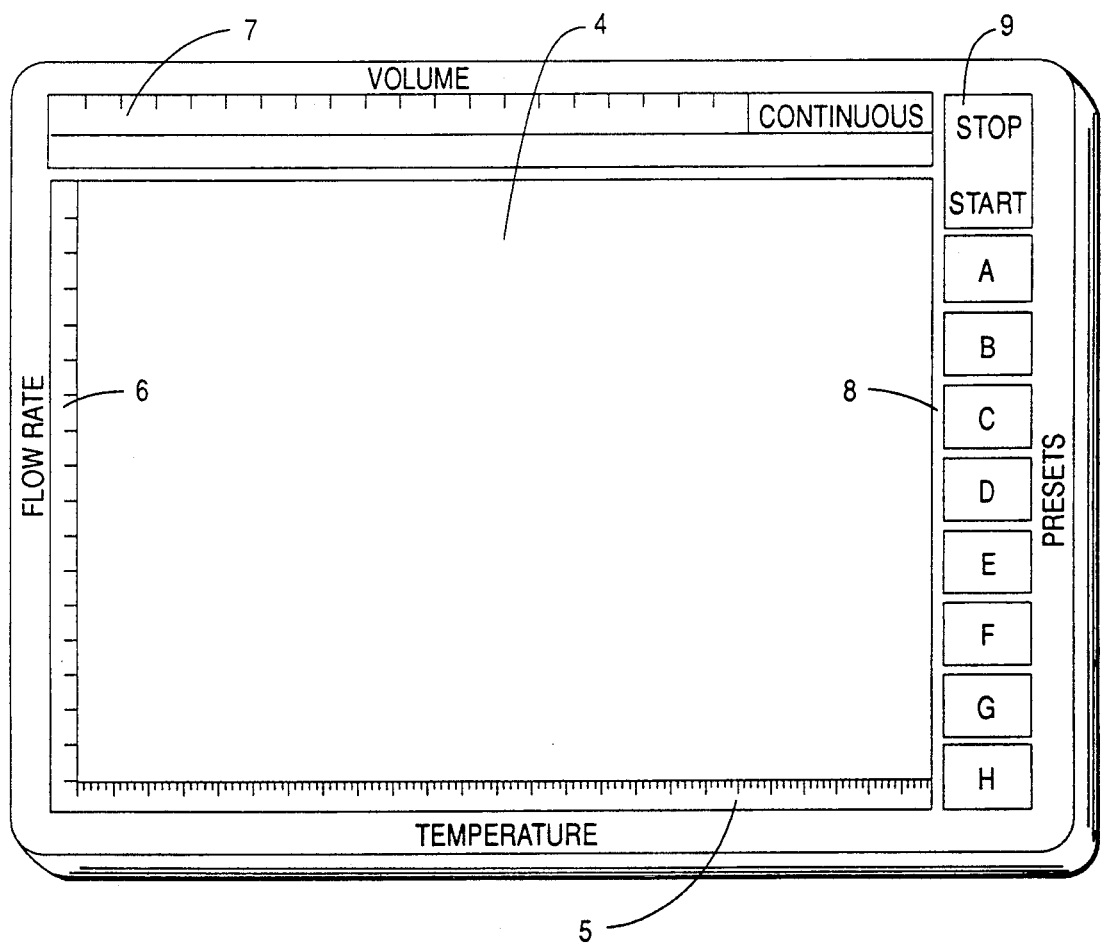
FIG. 2 is an illustration of the preferred embodiment of the control panel for use in a typical domestic application.

The preferred embodiment of a control panel for use in situations where convenience is preferred over high precision is described here. A typical application is in the average home. Referring FIG. 2, the control panel contains means for entering instructions for attaining any quantified combination of water temperature and flow rate within the range limits of the system. Further, this selection can be performed with just one touch to the panel. This is achieved by configuring the controls as a grid 4. One axis contains the temperature range 5 while the other contains the flow rate range 6. By touching any point on the grid the user selects a quantified combination of temperature and flow rate. Grid 4 can consist of an off-the-shelf touch sensitive screen adapted to provide a signal corresponding on standard X Y axes to temperature and flow rate selections.

The control panel also contains means for the input of instructions for delivery of a quantified volume of water. This is a simple linear control 7 with zero volume at one end, continuous flow at the other, and quantified volumes in between. The user merely touches a point along the control.

Also on the panel are preset controls 8. These allow the user to more easily and quickly select settings frequently accessed. With this control a user can draw a bath by touching one button. The correct water temperature will stop flowing when the correct volume has been dispensed.

The remaining control on the panel is the START/STOP button 9. Except when using a preset button, the water will not flow unless this button is touched. If it is already flowing, then when touched, the flow will stop. As a safety feature, the stop control overrides all others. It will terminate the flow even though a previously specified volume amount might not have yet been fully dispensed.

In conjunction with all the aforementioned input controls are displays for input selection and system status. The preferred embodiment can, when a selection is made, graphically display the selection by illuminating the appropriate values along the respective axes and, as required, the volume control. Simultaneously, the actual condition of the flow can be similarly displayed. Thus, it would be possible for the user to, at a glance, confirm a selection.

Additional graphic display within the grid itself can illuminate both the selected and actual temperature/flow rate points. Whenever a new selection is made, the grid and axis points would be illuminated while the status display points would be illuminated while the status display points would be seen moving across the grid and axes until they meet up with the selection points. The preset buttons can also be illuminated while in use.

Audible signals are also incorporated into the control panel. A single, short-duration tone is generated whenever an operation is completed, that is, whenever the flow is terminated. Continuous, short-duration tones are generated while the flow delivery differs from that which was selected.

It is also intended that the control panel, in specific cases, receive audio signals. This would enable physically impaired users to call out their commands to the invention. It would eliminate the need to be near the control panel to use it.

Remote control capability is also intended for the preferred embodiment. Instructions can be sent to the control panel via a remote and portable control unit. Again, this would assist disabled users and would also allow, for instance, a television-watching user to draw a bath from the living room.

Another method of control would link the control panel to an independent computer such as a typical personal computer found in many homes or to a computerized building management system. This would enable a user to communicate instructions to the invention from great distances. This would allow a user to program commands so that the invention would operate on its own as required. This method would have many applications in industry and research.

Some of the aforementioned features of the control panel are not required for many users. The invention will still maintain its integrity even if only a simple keypad is used. This method, in fact, would be more precise than the grid, though less convenient. Temperature, flow rate, and volume values can be entered to very small parts of whatever units they are being calibrated in. Light emitting diodes or similar displays can be used to display the quantified user command and system status.

It should be noted that the control range is limited by the capability of the fluid supply system servicing the invention's drive/mix apparatus. That is to say that the invention cannot deliver a fluid mix hotter or colder or of a higher flow rate than that which enters the system itself. The invention can, however, easily link with other devices which can heat or chill the fluid as required. This is described in greater detail later.

Power requirements are minimal and two-fold. Low voltage current will allow the microprocessor to run itself and to send and receive signals to and from the user and the valve drive means. Normal household type current will operate the valve drive means. The user is, therefore, isolated from any potential electricity induced harm.

The microprocessor 3 performs numerous functions. It receives commands from the user to supply a specified flow rate. It provides the user, at all times, with a display indicating the actual status of the mixed water flow. It receives information from the aforementioned sensors and performs calculations to determine dispensed volume. It compares this information with the user commands and sends its own resultant commands to the valve drive assemblies for appropriate and adjustment.

Figure 3:
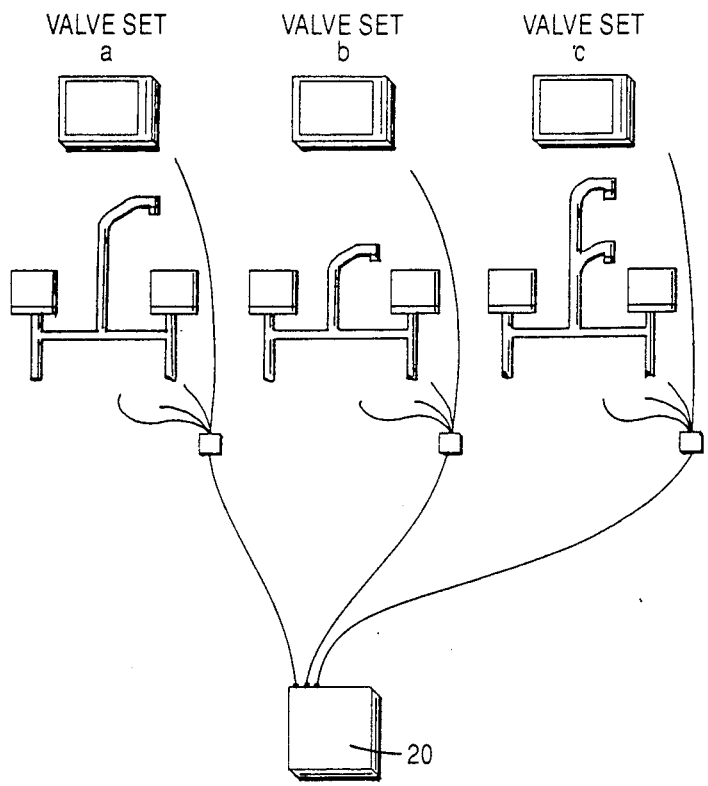
FIG. 3 is an illustration of the invention system in a typical domestic three-faucet application.
Figure 4:
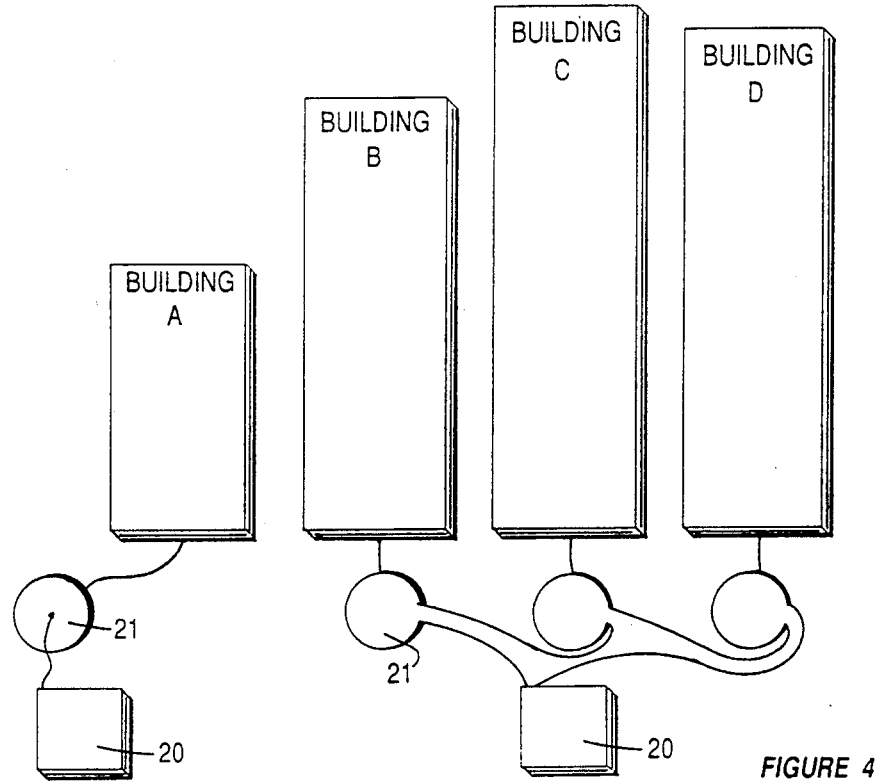
FIG. 4 illustrates the invention system as it would apply to as multi-faucet, multi suite building or buildings, using the same approach as illustrated in FIG. 3.

Referring to FIGS. 3 and 4, the microprocessor's particularly important function of being able to receive instructions from a multitude of users and accordingly control as many valve drive apparatuses is shown. This ability allows for the control of every faucet in a building, such as a hotel, or even more than one building, to be controlled by just one microprocessor.

The microprocessors used would vary only minimally from one application to another. Except for allowing for differences in the number of valve sets, the processing is identical. Ideally, the microprocessor would be modular in design to accommodate additions or deletions of valve sets. For example, the basic unit 20 could be designed to handle up to five valve sets. By adding other modules 21, the same microprocessor could handle up to an additional twenty sets, or another hundred, or more.

The same microprocessor could control different types of valve drive means such as pneumatic, hydraulic, or electric, even if they all reside on the same system. It could control a system having different types of fluids such as oil through one valve set, gaseous oxygen through another, and water through still another.

A safeguard in the system gives temperature control priority over flow rate control so that an inability to reach a desired flow rate at a given temperature is not compensated for at the expense of deviating from the chosen temperature. The preferred temperature will be maintained as closely as possible, if necessary, at a reduced flow rate. An alarm could be integrated with the system if temperature of the fluid cannot be maintained and fluid dispersing has to be stopped. This could be especially important in situations where fluid temperature is critical.

The electronic circuitry of the microprocessor can be embodied in the latest state of the art integrated circuit microchip form, but can be comprised of more standard electronic components.

The microprocessor is the physical embodiment, in circuit form, of the logic illustrated in FIGS. 5, 6, 7, 8 and 9.

Figure 5:
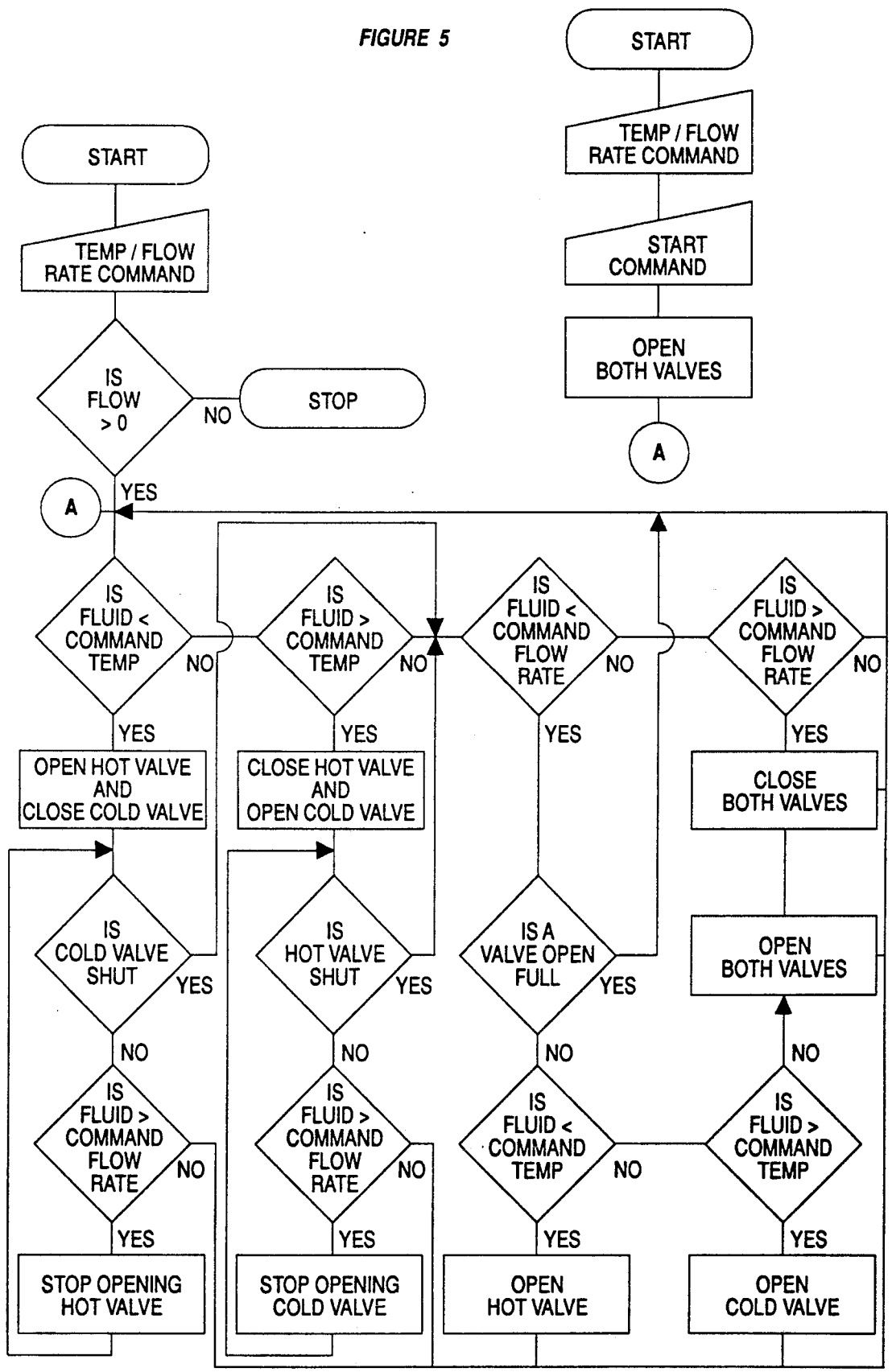
FIG. 5 is a logic diagram for the temperature and flow rate control aspect of the microprocessor.

Referring to FIG. 5, the logic diagram for temperature and flow rate control of the fluid mix is illustrated. The user first selects the desired temperature and flow rate of the fluid mix either by touching the appropriate position on the control panel grid 4 or by touching one of the re-programmable preset command buttons 8. If fluid is already flowing and the user is merely changing the temperature and and/or flow rate the microprocessor will immediately adjust the valves to match the new instructions. If, however, the valves are closed, no action will occur until the user activates the microprocessor by touching the START command button unless the new command was entered via a preset command button in which case the start command is incorporated into the preset command.

If the outflow temperature is less than that desired, the valves are adjusted accordingly and likewise if the temperature exceeds that desired. Virtually simultaneously, a flow rate sensor reading is taken to determine whether the overall flow rate is greater or less than that desired and both valves are accordingly adjusted. The valves are almost continuously adjusted by the microprocessor during the operation of the system.

To determine the appropriate valve action to have performed, the microprocessor first detects whether the sensor information is of a greater or lesser value than the respective user command. It then generates instructions to the valve drives to counter the discrepancy. The same instructions remain in effect until the sensor information matches the user commands or until a different user command is entered.

The instructions will vary, however, to accommodate variances in the fluid supply, such as when the hot water supply depletes. In this case, the hot valve will gradually open while the cold valve will gradually close, to maintain temperature and flow rate, until the temperature cannot be maintained even with the cold valve shut. At this point, the hot valve will also shut, thereby terminating the flow as per the safety feature to maintain temperature above all. The audio signal of the alarm will sound to indicate that the sensor information differs from the user command until the user changes the command.

Figure 6:
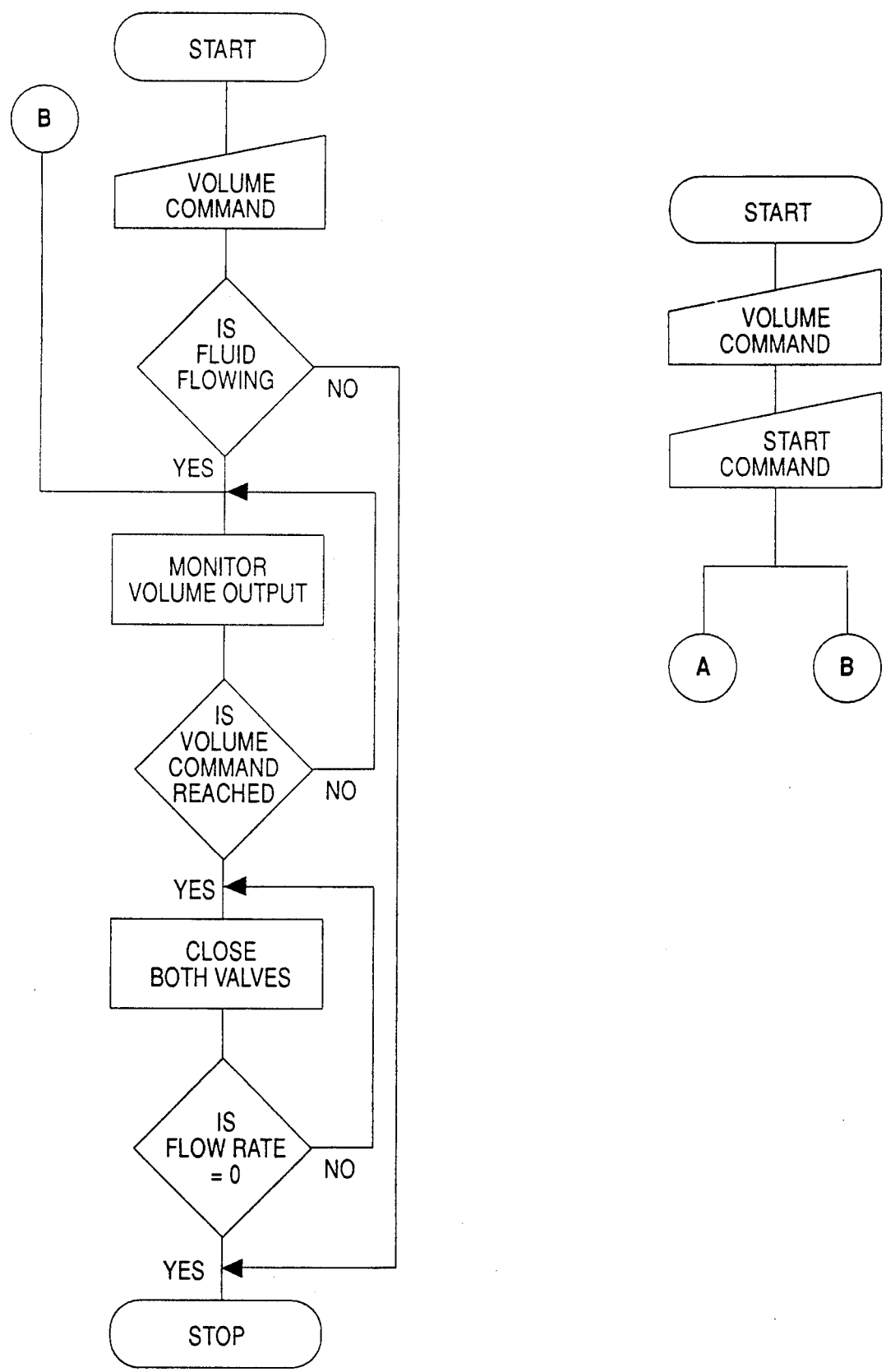
FIG. 6 is a logic diagram for volume control aspect of the microprocessor.

Referring to FIG. 6, the logic diagram for volume control is illustrated. When a specified volume is required, the user either touches a point on the volume display of the control panel or touches a preset command button. The microprocessor will, if fluid is already flowing, from the time of this most recent instruction, monitor the fluid dispensed, and when the desired volume has been dispensed, it will shut off both valves. As with the temperature/flow rate control, no action will occur until the user activates the microprocessor with a START command, unless a preset command was used. Volume control operation is performed independently of and concurrently with the temperature/flow rate control process.

Figure 7:
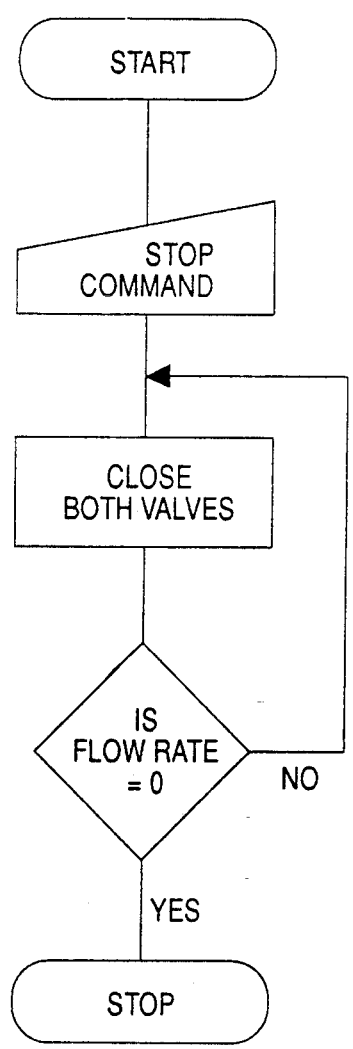
FIG. 7 is a logic diagram for the flow stop aspect of the microprocessor.

Referring to FIG. 7, the logic diagram for the flow stop control is illustrated. To terminate the fluid flow the user simply touches the STOP command button and the microprocessor will shut both valves regardless of whether or not a previously selected volume has been dispensed. The START and STOP command buttons are the same button.

Figure 8:
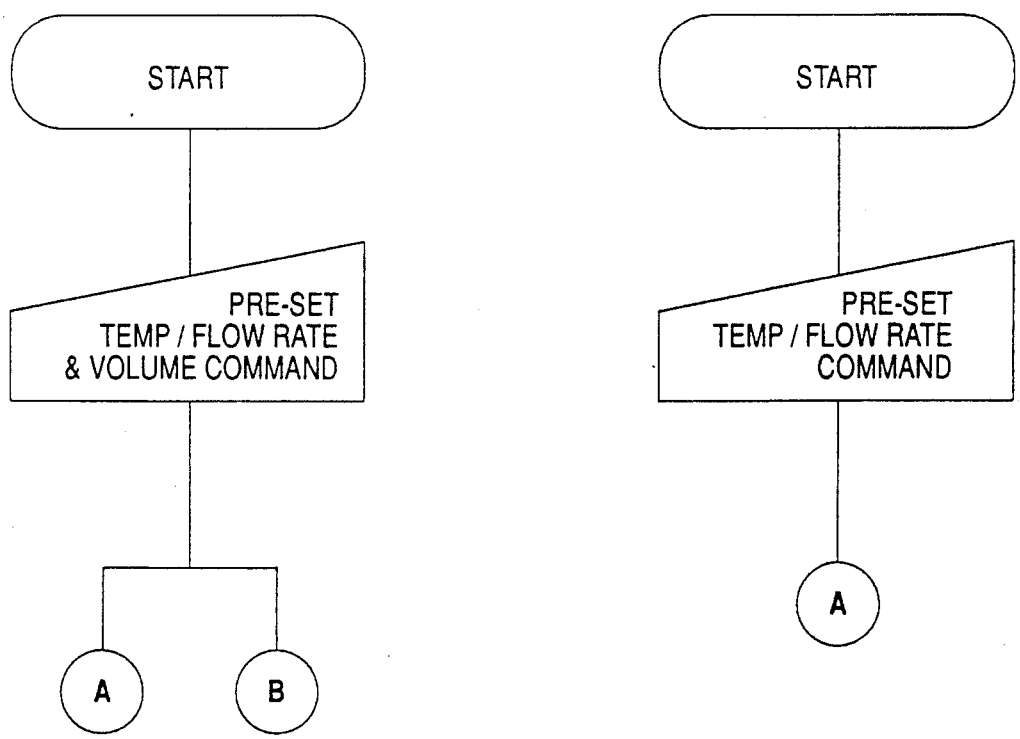
FIG. 8 is a logic diagram for the preset command control aspect of the microprocessor.

Referring to FIG. 8, the logic diagram for the preset control is illustrated. The preset values and preset button input can be changed at any time by the user. They can command the microprocessor to perform both temperature/flow rate control and volume control operations or simply the former if a continuous flow is desired. Activation of a preset command also performs a START command.

Regarding temperature and flow rate sensor placement within the piping system, the sensors could be located ahead of the valves in an attempt to anticipate the result by calculation before the fluid is mixed. This can be achieved by installing one set of fluid status sensors on each of the two incoming pipes and modifying the microprocessor circuitry accordingly. However, the almost immeasurably small increase in control efficiency would probably not offset the increased complexity, hardware, and cost of such a system. The speed and accuracy of the system operation, as it would be performed in the embodiment described herein, would be almost identical to the system with fluid sensors in advance of the valves, except in cases where the fluid supply is subject to sudden and large fluctuations of temperature or flow rate. In those cases the sensors should be located far enough in advance to allow the control circuit to adjust the valves at the appropriate time. In the case where sensors are located in advance, it would be preferable to have, in addition, post-mixing sensors, for precision of control and display of the fluid conditions.

Figure 9:
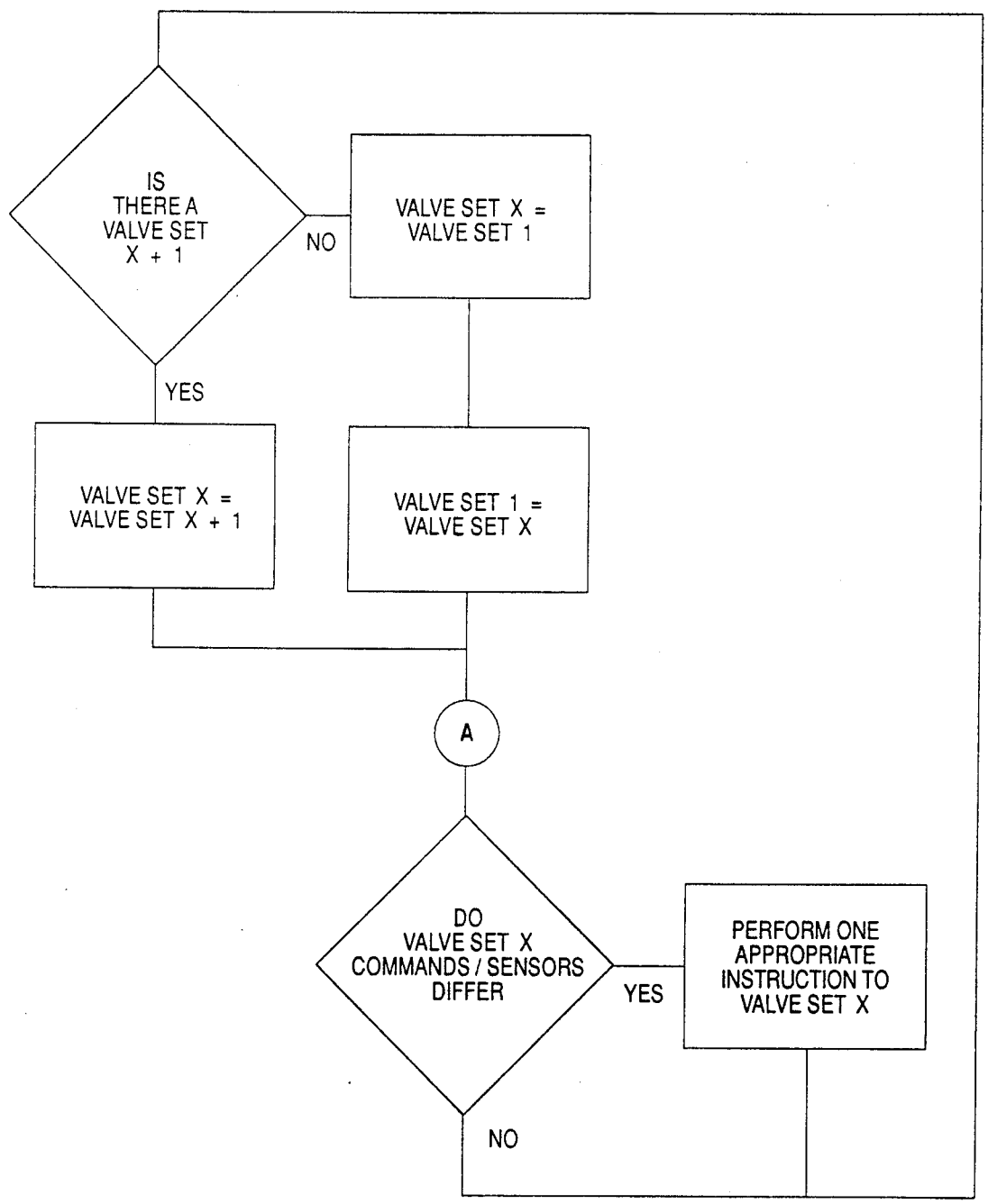
FIG. 9 is a logic diagram for the multi-user control aspect of the microprocessor.

Referring to FIG. 9, the logic diagram for the multi-user control is illustrated. This diagram illustrates how the microprocessor is able to control more than one set of valves at a time. Essentially, the microprocessor then turns to the next valve set to repeat the same process.

Given a system with, say, five valve sets, the microprocessor will address set one first, then set two, then set three, etc. After addressing set five, it will start again with set one and carry on indefinitely. It will continuously monitor all the sets on the system. It does not shut down when no user commands are preset. The requirement of of no fluid flow is in itself a command. The microprocessor will make sure, in this case, that the flow rate equals zero.

When the microprocessor encounters a deviation between the user command and the sensor data, it sends an appropriate valve drive command to eliminate the deviation. It does not then maintain surveillance over the deviate valves. It instead proceeds to address the next valve set. When it returns to the deviate valves it performs a new user command and sensor comparison.

Valve drive operation is not interrupted with each comparison since a very short duration time delay is incorporated into the valve drive command instruction circuit to allow the command to be in effect by the time the valve set is again addressed by the microprocessor.

The cycling happens quickly enough that the valves are controlled seemingly without interruption. Appropriate buffers, as just described, ensure a smooth valve operation. The high speed of the microprocessor operation ensures accuracy in achieving the users' commands even with many valve sets on the system.

To monitor the volumes dispensed through the numerous valves sets, the microprocessor uses a clock. Flow rate, for any given valve set from which a user wishes a particular volume, is calculated to determine dispensed volume. The individual valve sets3 volumes are monitored separately as required and the respective valves are closed when the specified volumes have been dispensed.

Improvements on the circuit logic as described here enable greater precision. Such an improvement would include the separation of the user command/sensor comparisons from the valve drive circuit. This would allow the microprocessor to more quickly send valve drive commands to the deviate valves by knowing which valves are deviate without cycling through to find out.

Another aspect of the invention is its ability to interface with other electronic systems. The invention can control, as required, devices to heat or chill fluids prior to its mixing them, if the user requires an end temperature outside the range of the normal incoming flows. Such a system could even take a single flow, divide it into two, heat one, cool other, and remix them to produce the desired flow temperature.

The invention can itself, as described earlier, be controlled by another system. A master computer can instruct the invention to perform in pre programmed ways. The master computer is, in effect, the user. Such control of the invention would be found in industry and 'smart' buildings.

It is intended to show that this invention is such that, with minor changes, some inherent within its design, and others that are obvious to those skilled in the related fields, its is essentially an electronic valve control device. It may be designed and constructed in a number of ways other than those described herein. It also has applications in addition to those described herein. Such variations are limited only by the spirit of the invention and by the claims.

I claim:

1. A control system for controlling fluid temperature, flow rate and volume dispensed by at least one piping system comprising:

a) a first valve for regulating a first flow of fluid from a first fluid supply mans in the piping system;

b) a second valve for regulating a second flow of fluid, having a different temperature from the first flow of fluid, from a second fluid supply mans in the piping system;

c) drive means for activating each of the first and second valves;

d) sensing means for determining the degree to which each of the first and second valves is open;

e) mixing and dispensing means connected to the first and second fluid supply means, for receiving fluid from each of the first and second fluid supply means, and for carrying mixed fluid to the place of dispensing of the mixed fluid;

g) mixed fluid temperature sensing means for sensing the temperature of mixed fluid at a place in the mixing and dispensing means;

g) mixed fluid flow rate sensing means for sensing the flow rate of mixed fluid at a place in the mixing and dispensing means;

h) user interface means, comprising a fluid flow rate selecting means for receiving user inputs of a selected flow rate from a range of available flow rates, and a fluid temperature selecting means for receiving user inputs of a selected temperature from a range of available temperatures;

i) processor means for receiving valve data from the valve open or closed sensing means, temperature data from the mixed fluid temperature sensing means, flow rate data from the mixed fluid flow rate sensing means, and the user interface means, comparing the selected fluid flow rate and the selected fluid temperature with the valve data, the temperature data, and the flow rate data, and sending signals to control each of the drive means to open or close each valve to the extent required in order to obtain the selected fluid flow rate and the selected fluid temperature of dispensed fluid;

in which the processor comprises decision making means for prioritizing temperature control over flow rate control in the even that both the selected fluid flow rate and the selected fluid temperature of the dispensed fluid are not obtainable from the piping system, and for sending signals to the drive means to achieve the selected fluid temperature and a flow rate as close as is obtainable to the selected fluid flow rate for the dispensed fluid.

2. A control system as defined in claim 1 in which
a) the user interface means comprises a one-touch sensitive screen having fluid flow rate range along a first axis and a fluid temperature range along a second axis;
b) the interface means comprises a fluid volume selecting means for receiving user inputs of a selected volume of dispensed fluid from a range of available volumes that could be dispensed;
c) the processing means receives volume data from a fluid volume sensing means for sensing the volume of fluid dispensed from the mixing and dispensing means, the fluid volume sensing means being in a receptacle for the dispensed fluid and sending signals to the processing means and affecting the drive means in order to obtain the selected fluid volume of the dispensed fluid;
d) the processor means receives data from a plurality of piping systems, and sends signals to control multiple sets of the drive means for each of the first and second valves in order to obtain multiple selected fluid flow rates and selected fluid temperatures at a multiplicity of locations throughout the piping systems;
e) the processor comprises decision-making means for sending signals to the drive means to terminate fluid flow in the event that the selected fluid temperature of the dispensed fluid is not obtainable from a piping system;
f) the interface means comprises means for displaying the selected fluid flow rate, the selected fluid temperature and the selected fluid volume and the actual fluid flow rate, temperature and volume dispensed;
g) the drive means comprise motors;
h) the signals sent from the processor to the drive means are electrical signals.

* * * * *